United States Patent
Lipson et al.

(10) Patent No.: US 6,684,003 B2
(45) Date of Patent: Jan. 27, 2004

(54) ALL OPTICAL SWITCH FOR OPTICAL INTEGRATED CIRCUITS

(75) Inventors: Michal Lipson, Waltham, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/825,075

(22) Filed: Apr. 3, 2001

(65) Prior Publication Data

US 2002/0094153 A1 Jul. 18, 2002

Related U.S. Application Data

(60) Provisional application No. 60/194,253, filed on Apr. 3, 2000.

(51) Int. Cl.[7] .............................. G02B 6/35; G02B 6/42; G02B 6/26
(52) U.S. Cl. .............................. 385/23; 385/18; 385/16; 372/70; 372/72; 372/92; 372/99
(58) Field of Search ............................... 385/23, 15–18; 359/320; 372/8, 69, 70, 92, 99, 102, 109, 72

(56) References Cited

U.S. PATENT DOCUMENTS

| | | | | |
|---|---|---|---|---|
| 4,573,767 A | * | 3/1986 | Jewell | 359/243 |
| 4,585,301 A | * | 4/1986 | Bialkowski | 359/243 |
| 5,037,169 A | | 8/1991 | Chun | 385/16 |
| 5,291,314 A | | 3/1994 | Agranat et al. | 359/100 |
| 5,909,303 A | * | 6/1999 | Trezza et al. | 359/248 |
| 6,081,634 A | * | 6/2000 | Attard | 385/16 |

OTHER PUBLICATIONS

Roberts et al., MOVPE grown Bragg Stacks for Microresonator Devices, Mar. 20, 1992, III–V Compound Semiconductor Materials Growth, IEE Colloquium on Mar. 20, 1992.*

H. Kobayashi et al., "Demonstration of Optical Gating Using a Semiconductor–Doped Glass Etalon," *Photonic Switching II: Proceedings of the International Topical Meeting*, Kobe, Japan, Apr. 12–14, 1990, pp. 175–178.

Y. M. Liu et al., "All–Optical Switching in an Asymmetric Silicon Fabry–Perot Étalon Based on the Free–Carrier Plasma Effect," *Applied Optics*, Optical Society of America, Washington, D.C., vol. 33, No. 18, Jun. 20, 1994, pp. 3871–3874.

Pierre R. Villeneuve et al., "Single–Mode Waveguide Microcavity for Fast Optical Switching," *Optics Letters*, Optical Society of America, Washington D.C., vol. 21, No. 24, Dec. 15, 1996, pp. 2017–2019.

* cited by examiner

*Primary Examiner*—Brian Healy
*Assistant Examiner*—Kevin S Wood
(74) *Attorney, Agent, or Firm*—Samuels, Gauthier & Stevens, LLP

(57) ABSTRACT

An optical switch operating with an optical pumping source. The switch includes a microcavity structure that is resonant with both the pumping source and the input optical signal. The microcavity structure includes a cavity in between two reflectors. The input optical signal is switched from one to zero, by varying the pump source intensity. The microcavity provides amplification of the pumping energy allowing for a nonlocal optical power source. In addition it also provides a way for fast optical modulation of the input optical signal using continuous wave pumping source.

12 Claims, 4 Drawing Sheets

ALL OPTICAL SWITCH FOR OPTICAL INTEGRATED CIRCUITS

PRIORITY INFORMATION

This application claims priority from provisional application Ser. No. 60/194,253 filed Apr. 3, 2000.

The invention was made with government support under Grant No. DMR 9808941 awarded by the National Science Foundation. The government has certain rights in the invention.

BACKGROUND OF THE INVENTION

This invention relates to resonant optical microcavities and to switching optical signals.

The prior art contemplates switching optical signals by controlling the index of refraction of the optical medium in which signal propagates. The disadvantage of these devices is the strong pump power required for total switching. This high pumping power limits the use of these switches in integrated circuits for example where non-local optical power source is used.

SUMMARY OF THE INVENTION

The present invention provides an all-optical switch including a microcavity structure that is resonant with both an optical pumping source and an input optical signal. The microcavity structure includes a cavity in between two reflectors. The transmission of the input optical signal through the structure is switched from one to zero, by varying the pump intensity incident on the structure. The microcavity structure provides amplification of the pumping energy allowing for nonlocal optical power source.

In accordance with one exemplary embodiment of the invention there is provided an optical switch for controllably switching an input optical signal using an optical pumping source. The switch includes a resonant microcavity structure with a resonance tunable by the optical pumping source including a cavity in between first and second reflectors. The resonant microcavity structure has a high penetration length at the wavelength of the optical pumping source and at the wavelength of the input optical signal. The optical pumping source and the input optical signal are at resonance or multiple resonance of the microcavity structure. The swiching time can be very short (depending on the specific of the structure and material used) therefore the structure also provides a way for fast optical modulation using a continuous wave pumping.

DETAILED DESCRIPTION OF THE INVENTION

Figure 1:
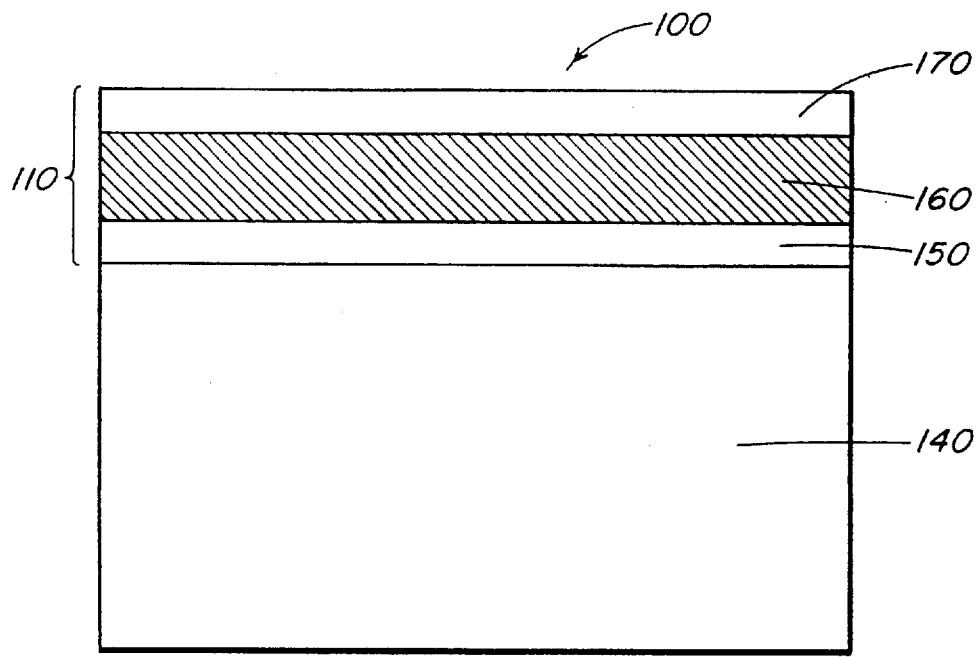
FIG. 1. is a schematic diagram of an exemplary embodiment of a planar microcavity having a microcavity structure on a substrate in accordance with the invention.

FIG. 1 is a schematic block diagram of an exemplary embodiment of a planar microcavity 100 having a microcavity structure 110 on a substrate 140 in accordance with the invention. The microcavity structure 100 includes in an ascending order from the substrate 140, a bottom reflector 150, a cavity 160, and a top reflector 170. Substrate 140 may be any of a number of materials being used in integrated circuits, such as semiconductors, glasses, ceramics, etc. Silicon can be especially useful, since many integrated circuits are grown on Si substrates. Both of the reflectors 150, 170 may be in the form of thin metal films or distributed Bragg reflectors (DBRs) layers. The DBRs are typically in the form of pairs of materials with different indices of refraction. These materials are selected from semiconductors, conductive material oxides, glasses and glass-like oxides.

Figure 2:
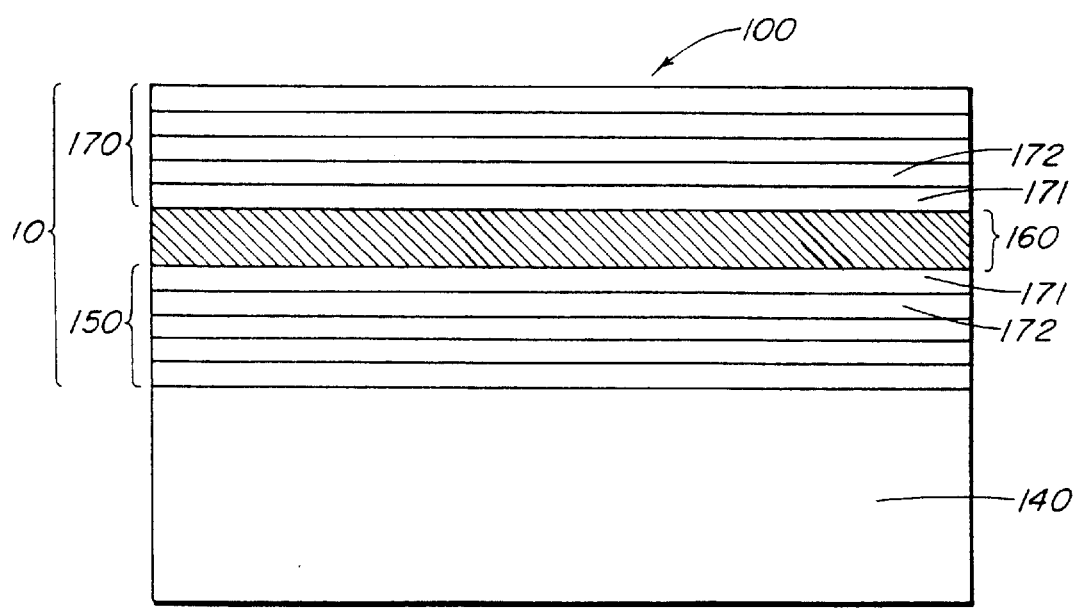
FIG. 2. is a more detailed schematic diagram of the planar microcavity shown in FIG. 1.

FIG. 2. is a more detailed schematic block diagram of the planar microcavity shown in FIG. 1. Each reflector 150, 170 includes a plurality of pairs of quarter-wave layers, e.g., layers 171 and 172. Each pair includes a layer having an index of refraction that is higher than the index of refraction of another layer of the pair. The thickness of each of the layers 171 and 172 is approximatelly equal to $\lambda/4n_1$ and $\lambda/4n_2$. The number of periods N of the DBR satisfies the relation:

$$R = 1 - 4\left(\frac{n_L}{n_H}\right)^{2N} > 0.99 \tag{1}$$

In the case of the index of refraction of the cavity being higher than the averaged index of refraction of the reflectors, the layers in the bottom and top DBRs, e.g., 171, are deposited such that the layers with lower index of refraction of each reflector are adjacent to the cavity 160. The total thickness of the cavity 160 $L_{cav}$, is an even number of multiple of $\lambda/2n$, n being the index of refraction of the cavity layer. In the case of the index of refraction of the cavity being lower than the averaged index of refraction of the reflectors, the layers in the bottom and top DBRs, e.g., 171, are deposited such that the layers with higher index of refraction of each reflector are adjacent to the cavity 160. The total thickness of the cavity 160 $L_{cav}$, is an odd number of multiple of $\lambda/2n$. The cavity consists of a material that its index is sensitive to high power optical power. This can be due to for example carrier injection, or non-linear effects.

The invention is described with reference to a specific exemplary embodiment in which the cavity layer consists of Si embedded in a monolithical Fabry Perot cavity. The cavity mode has a resonance at 1530 nm. In the exemplary embodiment, the structure comprises Si substrate 140, bottom DBR 150, Si cavity layer 160, and top DBR 170. The bottom and top DBR include respective pairs of quarter wave length of the layers 171 of $SiO_2$, and quarter wave layers 172 of $SiO_2$. The thickness of each $SiO_2$ layer 172 with n~3.3 equals to 113 and of each $SiO_2$ 265 nm n~1.51. has a thickness of.

Figure 3:
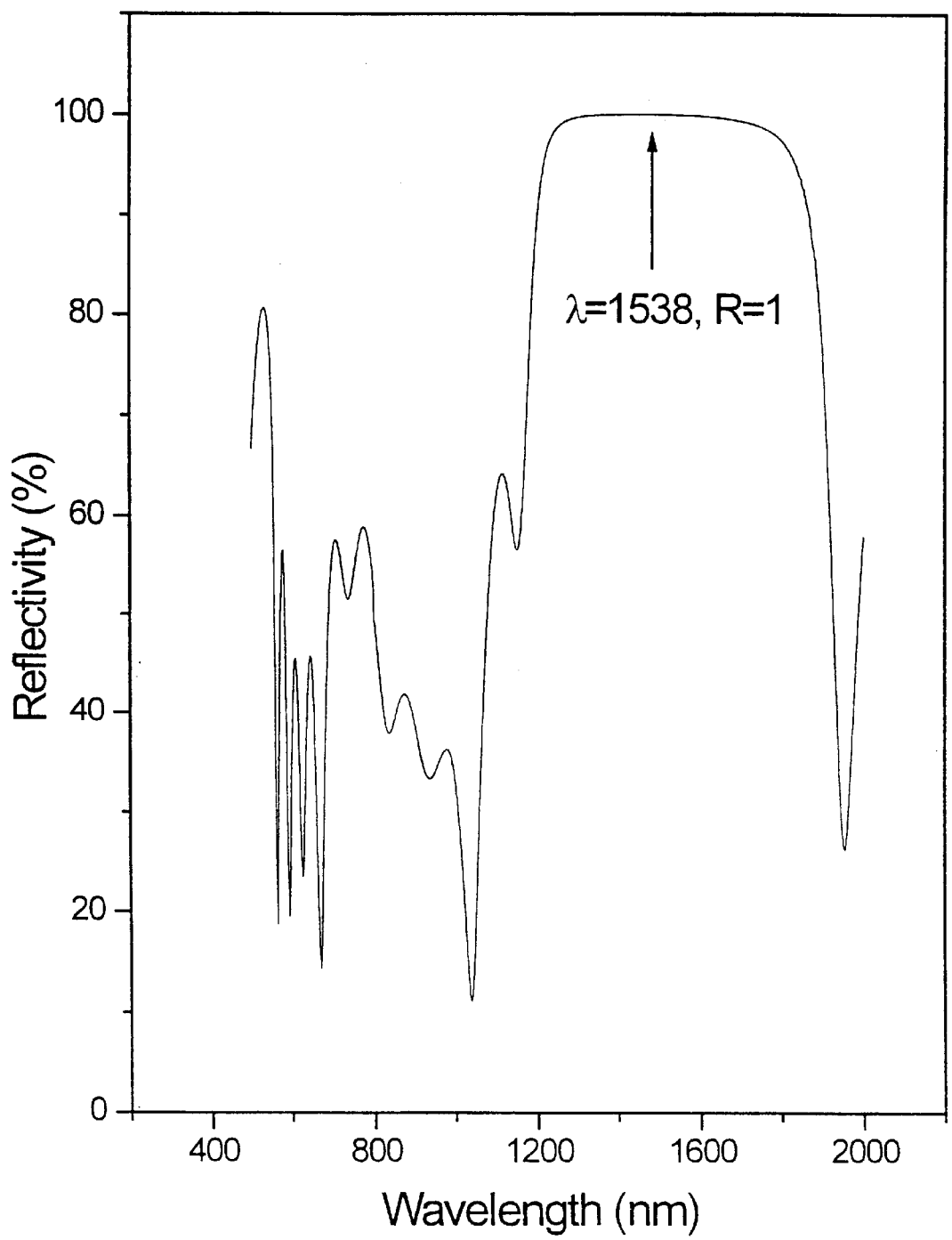
FIG. 3. is a graph showing the reflectivity of the bottom and top distributed Bragg reflectors of the exemplary embodiment of the invention.

The Si layer 160 correspond to 466 nm. It is equal to half the wavelength 1530 nm divided by the refractive index of Si (n~3.3). The bottom and the top DBR reflectors include 5 pairs of layers 171 and 172. The reflectivity of the bottom and top DBR are 99.9%. This is shown in FIG. 3. FIG. 3. is a graph showing the reflectivity of the bottom and top distributed Bragg reflectors of the exemplary embodiment of the invention.

Figure 4A:
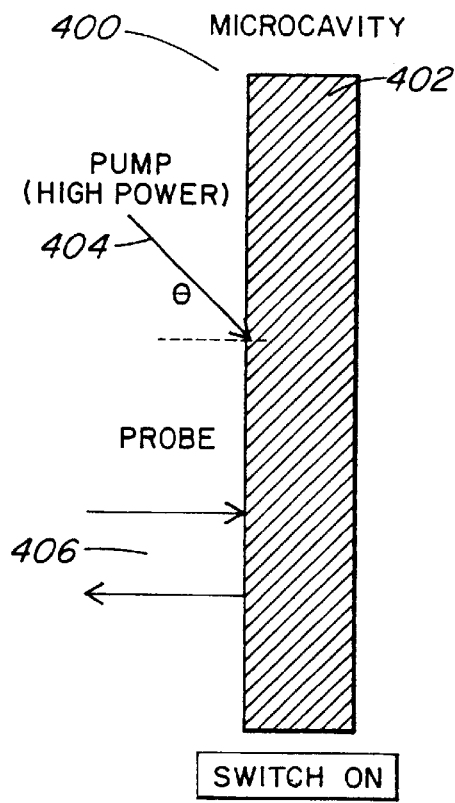
FIGS. 4A and 4B are schematic diagrams of an exemplary embodiment of a switch arrangement having a planar cavity with and without pump, respectively, in accordance with the invention.
Figure 4B:
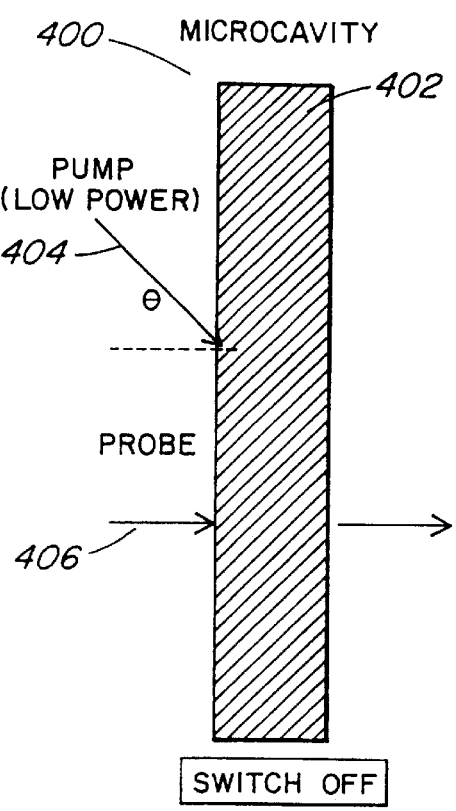
Figure 5:
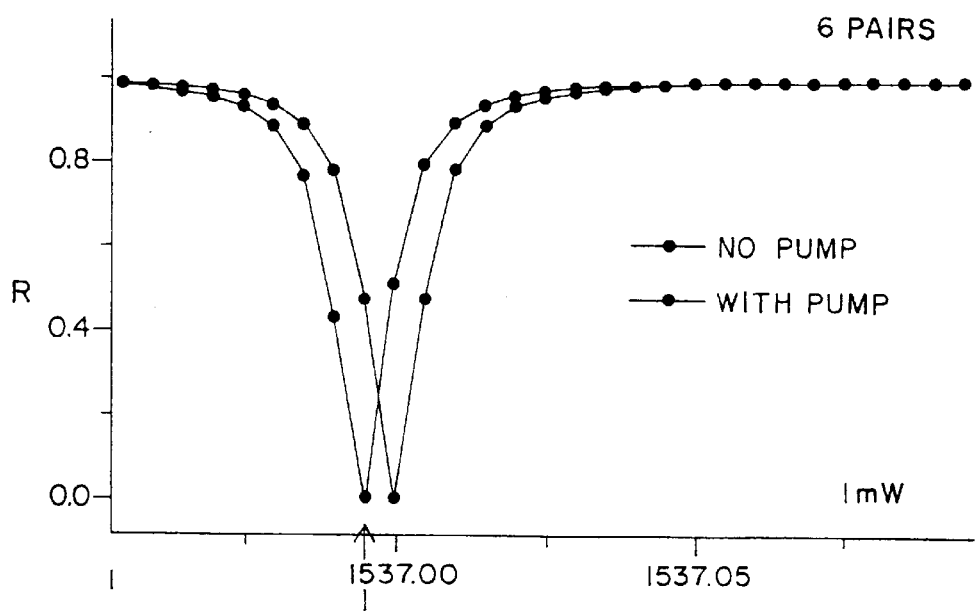
FIG. 5. is a graph showing the reflectivity spectrum of the exemplary embodiment with and without pump in accordance with the invention.

FIGS. 4A and 4B are schematic diagrams of an exemplary embodiment of a switch arrangement 400 including a planar microcavity 402 with and without a pump source 404, respectively, in accordance with the invention. FIG. 5. is a graph showing the reflectivity spectrum of the exemplary embodiment with and without pump in accordance with the invention.

For optical switching, a light probe source 406 of very low intensity is tuned to the resonance in the reflectivity. A probe of a wavelength equal to 1530 nm is used. When no pump is used its transmission is approximately one (see FIG. 5). The probe source is incident on the structure parallel to the axis of growth. Its intensity is low, given by:

$$I_{probe} < 0001 I_{pump} \quad (2)$$

A pump power is used to change the transmission (or reflection) spectrum of the switch arrangement. If the resonance reflectivity is changed, this will be reflected by the intensity of the probe beam. In the exemplary embodiment, this can be done by changing the index of refraction of the Si layers. Using a pump source of wavelength above the Si bandgap (~500 nm), electrons are injected in the conduction band thus changing the Si index of refraction. This change induces a change in the cavity mode.

Figure 6:
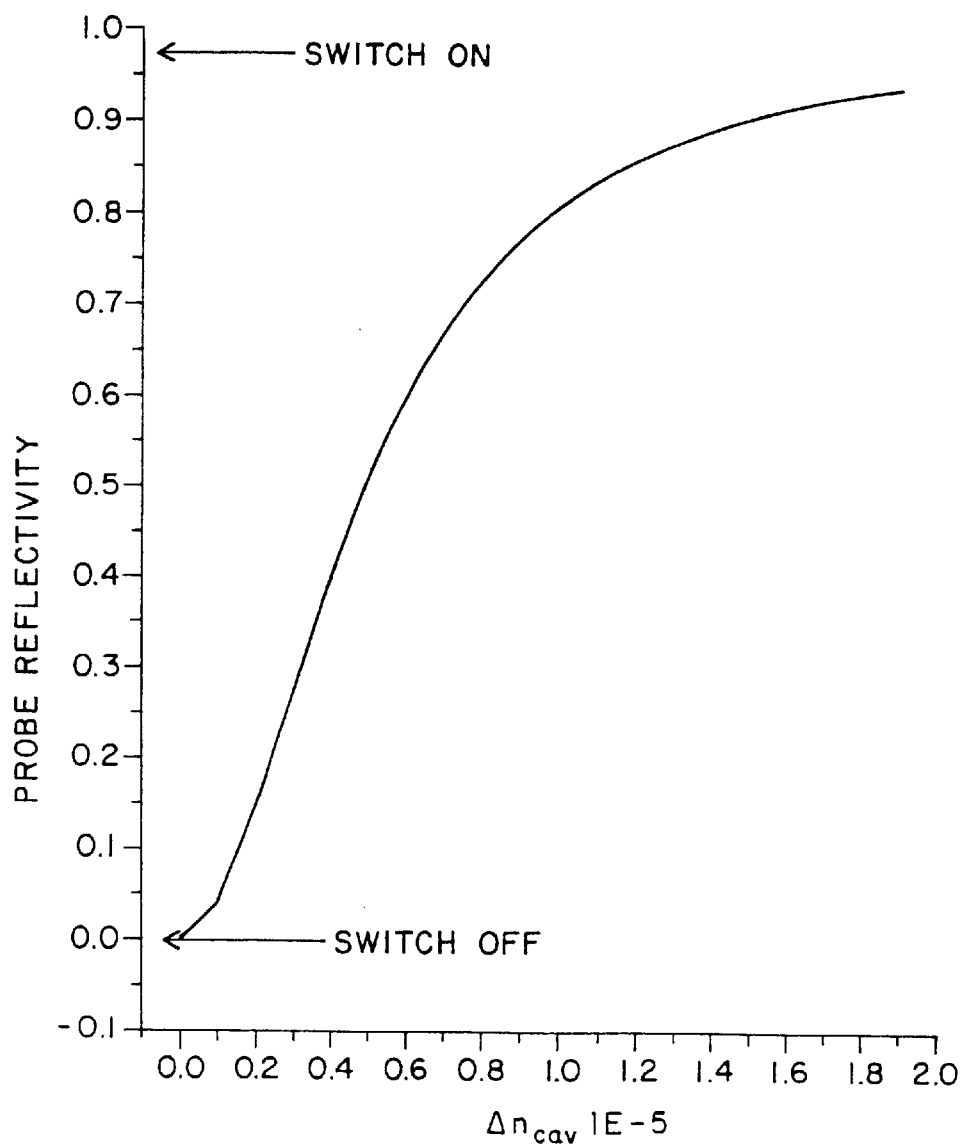
FIG. 6. is a graph showing the change of the probe signal of the exemplary embodiment of the invention with the change of the cavity index of refraction.

FIG. 6. is a graph showing the change of the probe signal of the exemplary embodiment of the invention with the change of cavity index of refraction. The change in the index of refraction is linear with pumping power. In the invention, the pumping power in the cavity layer is greatly enhanced. This power enhancement is achieved when the pump source incident angle (relative to the axis of growth) and wavelength satisfy the following relation:

$$\theta = \sqrt{(1 - m\lambda_{pump}/\lambda_{probe}) 2n^2} \quad (3)$$

where $\lambda_{pump} < \lambda_{probe}$ is the pumping wavelength, m>1 is an integer number, h is the Planck constant and c is the speed of light in vacuum.

The pump power $I_{pump}$ (in Watts) required for reflecting the probe (total switching) satisfies the relation:

$$I_{pump} \alpha^2 \gamma \beta (L_H + L_L)^N / A > 2E-5 \quad (4)$$

where $\alpha$ is the absorption of the semiconductor at the wavelength $\lambda_{pump}$, $\gamma$ is the change in index of refraction per free carrier generated per unit volume, A is the pump source spot size and $\beta$ is the light intensity enhancement factor in the cavity layer. The latter is calculated using standard transfer matrix formalism. In the exemplary embodiment, the minimum required pump power for switching off is about 10 mW.

The same structure and setup can be used for an inverted switch where the transmitted signal is switched on. For such a switch the probe wavelength is tuned to: $\lambda_{probe} - \Delta\lambda_{probe}$, where $\Delta\lambda_{probe}$ is the spectral width of the cavity mode given by:

$$\Delta\lambda_{probe} (\lambda_{probe} (1-r)^2)/(1+r)^2 \quad (5)$$

where $|r|^2 = R$. Note equation 1.

The swiching time corresponds to the tme it takes to the optical mode resonant with the pumping to detune away from the pumping frequency. This depends on the sharpness of the mode ($\sim = (1+r)^2/((1-r)^2)$) and the dependence of the index of the cavity with pumping intensity. For large values of refrelectivity r (~0.999), this switching time can be down to THz, providing a way to fast modulate the signal using a continuous wave pumping.

The described switch structures can be highly manufacturable, and can be integrated with Si microelectronics.

Although the present invention has been shown and described with respect to several preferred embodiments thereof, various changes, omissions and additions to the form and detail thereof, may be made therein, without departing from the spirit and scope of the invention.

What is claimed is:

1. An optical switch for controllably switching an input optical signal using an optical pumping source comprising:
a resonant microcavity structure with a resonance tunable by said optical pumping source including a cavity in between first and second reflectors, wherein said first and second reflectors comprising DBR reflectors, said DBR layers comprise alternating layers of high and low indices of refraction $n_H$ and $n_L$, of approximate thickness of $\lambda/4n_H$ and $\lambda/4n_L$, the number of pairs N of both mirrors satisfying the relation $$R = 1 - 4\left(\frac{n_L}{n_H}\right)^{2N} > 0.9,$$

said resonant microcavity structure having a high penetration length at the wavelength of said optical pumping source and at the wavelength of said input optical signal, said cavity comprising of a material with index of refraction sensitive to incident optical power, said optical pumping source and said input optical signal being at resonance or secondary resonance of said microcavity structure.

2. The switch of claim 1, wherein said DBR layers comprise pairs of materials with different indices of refraction.

3. The switch of claim 2, wherein said materials are selected from the group of semiconductors, conductive material oxides, glasses and glass-like oxides.

4. The switch of claim 1, wherein said cavity comprises an index of a refraction higher than the averaged index of refraction of the first and second reflectors and with a thickness of $L_{cav}$, is approximately an even number of multiple of $\lambda/2n$, n being the index of refraction of the cavity layer.

5. The switch of claim 1, wherein said cavity comprises an index of refraction lower than the averaged index of refraction of the first and second reflectors and with a thickness $L_{cav}$, is approximately an odd number of multiple of $\lambda/2n$, n being the index of refraction of the cavity layer.

6. The switch of claim 1, wherein said cavity comprises a polymer based material.

7. The switch of claim 1, wherein said cavity comprises a semiconductor based material.

8. The switch of claim 1, wherein said cavity comprises a non-linear material.

9. The switch of claim 1, wherein said input optical signal is controllably switched from being mostly transmitted through the cavity to being mostly reflected by the cavity.

10. The switch of claim 1, wherein said input optical signal is controllably switched from being mostly reflected by the cavity to being mostly transmitted through the cavity.

11. The switch of claim 1 for fast optical modulation of the said input optical signal, said optical pumping is a continuous wave source.

12. The switch of claim 1 for fast optical modulation of the said input optical signal, said optical pumping is a modulated wave source.

* * * * *